Figure 1:
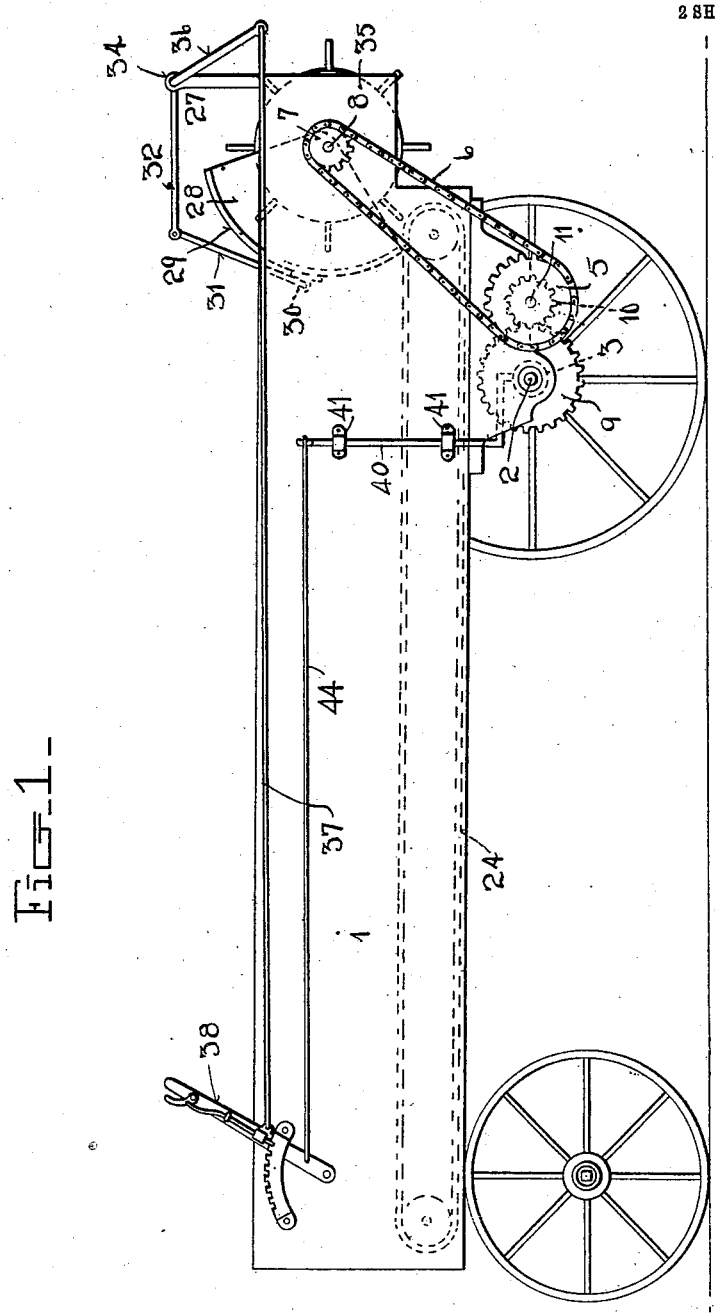

No. 884,515. PATENTED APR. 14, 1908.
B. E. MILLER.
MANURE SPREADER.
APPLICATION FILED JAN. 14, 1907.

2 SHEETS—SHEET 1.

Witnesses
L. B. James
C. H. Griesbauer

Inventor
B. E. Miller
by H. B. Willson & Co.
Attorneys

No. 884,515. PATENTED APR. 14, 1908.
B. E. MILLER.
MANURE SPREADER.
APPLICATION FILED JAN. 14, 1907.
2 SHEETS—SHEET 2.
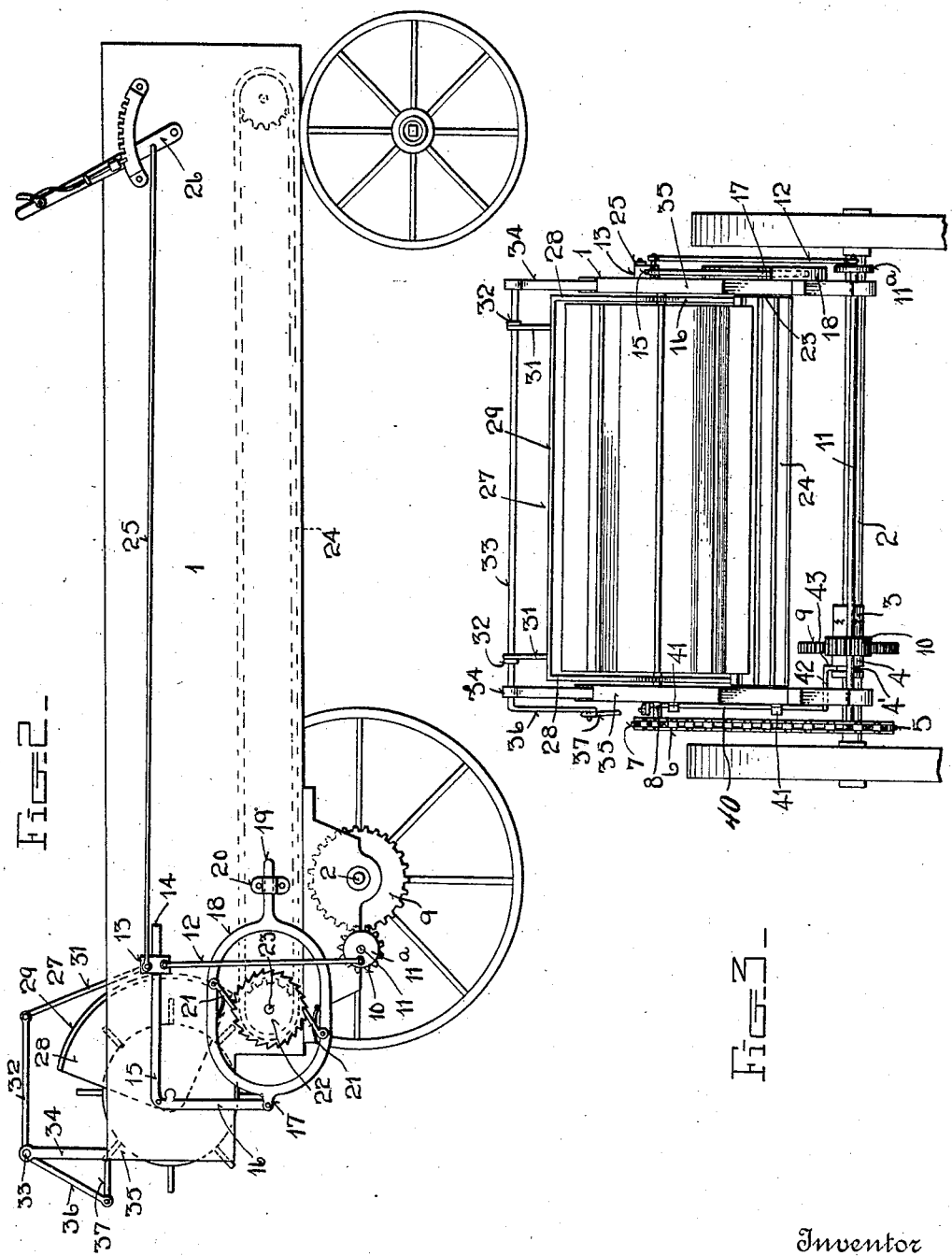
Witnesses
Inventor
B.E. Miller
Attorneys

UNITED STATES PATENT OFFICE.

BERTIE E. MILLER, OF BRANDON, IOWA.

MANURE-SPREADER.

No. 884,515.

Specification of Letters Patent.

Patented April 14, 1908.

Application filed January 14, 1907. Serial No. 352,156.

*To all whom it may concern:*

Be it known that I, BERTIE E. MILLER, a citizen of the United States, residing at Brandon, in the county of Buchanan and State of Iowa, have invented certain new and useful Improvements in Manure-Spreaders; and I do declare the following to be a full, clear, and exact description of the invention, such as will enable others skilled in the art to which it appertains to make and use the same.

This invention relates to manure spreaders.

The object of the invention is to improve, simplify and render thoroughly efficient the mechanism for actuating the apron, and, further, to improve the lifting means for the end gate.

With the above and other objects in view, as will appear as the nature of the invention is better understood, the same consists in the novel construction and combination of parts of a manure spreader, as will be hereinafter fully described and claimed.

In the accompanying drawings forming a part of this specification, and in which like characters of reference indicate corresponding parts,—Figure 1 is a view in side elevation of a manure spreader embodying the features of the present invention with the rear wheel removed to display the mechanism for driving the spreading cylinder; Fig. 2 is a similar view, of a portion of a spreader, taken from the opposite side from that shown in Fig. 1; and Fig. 3 is an end view looking toward the front of the spreader.

The body 1 of the machine may be of the usual or any preferred construction, and therefore needs no detail description.

The rear axle 2 is revoluble and has a clutch member 3 fixed thereon that is designed to be engaged by a second clutch member 4 splined on the axle and shiftable longitudinally thereof by any preferred form of shifting mechanism. A sprocket wheel 5 is rigidly secured to a shaft 11 supported at the rear of the axle 2 in any suitable manner on the machine body. This sprocket wheel 5 is engaged by a sprocket chain 6 which passes to and around a sprocket wheel 7 carried by the spreader cylinder shaft 8, said cylinder being of the usual or any preferred construction. The shifting mechanism for the clutch member 4 is here shown in the form of an L-shaped outstanding shifting lever or rod 40, the long arm of which is mounted in vertically spaced keepers as 41 on the body of the machine and the free end of the short arm 42 has a lateral finger 43 which operates in an annular groove 4' in the clutch member 4. The upper free end of the long outstanding arm of the rod 40 has a crank arm which is pivotally connected with a longitudinally arranged operating rod 44 connected to the lower end of a lever 38. So long as the clutch is unlocked, all of the operating mechanisms of the machine will remain at rest, but as soon as the clutch is locked, said mechanism will at once be actuated, as will be readily understood. Fixed to the clutch member 4 is a master-gear 9 that meshes with a gear 10 carried near one end of the shaft 11, the other end of which carries a disk 11$^a$. The disk has connected with it one end of a pitman rod 12, the other end of which connects with a slide 13 mounted on the long arm 14 of an L-lever 15 pivoted at its bend to the machine body. The short arm 16 of the lever is pivotally connected with an extension 17 at one end of a yoke 18, the other end of which is provided with a similar extension 19 that works in a guide or keeper 20 secured to the machine body.

The yoke is approximately a hollow rectangle in form, and its opposed, longitudinal members carry oppositely-operating spring pressed pawls 21 that are designed to engage a ratchet wheel 22 carried by a shaft 23 that supports the rear portion of the endless apron 24, the front portion of which is supported in the usual or any preferred manner. When the disk 11$^a$ is revolved, vibratory motions are imparted to the lever, causing it to reciprocate the yoke and the latter, through the pawls 21, to revolve the ratchet 22 and thus move the apron 24 in a step-by-step manner, thus feeding the manure to the spreader cylinder, which may be of any preferred construction and which distributes it in the usual way. In order to vary the throw of the lever and thus the feed of the manure, the slide 13 has connected with it one end of a rod or wire 25, the other end of which connects with a lever 26 that, as usual, is arranged at the front of the machine and within easy reach of the operator. By shifting the slide, the operator can readily control the amount of manure spread.

Another feature resides in a novel arrangement of mechanism for raising and lowering the end gate 27 to permit or prevent the discharge of manure. The end gate consists, generally, of approximately segmental ends 28 and a cover 29 secured thereto, the ends being suitably pivoted to the side of the machine body. Secured to the cover are two straps or eyes 30, with which are connected the lower ends of a pair of levers 31, the upper ends of which are pivotally connected to a second pair of levers 32 carried by a rock shaft 33 supported by brackets 34 secured to extensions 35 on the sides of the machine body. To the depending arm 36 of the rock shaft is connected one end of a rod or wire 37, the other end of which is connected with the clutch operating lever 38. By this arrangement, when the clutch is locked, the end gate is raised and thus permits the escape of manure, but as soon as the clutch is unlocked, the gate is lowered and passes around the rear end of the apron and thus prevents the escape of the manure.

It will be seen from the foregoing description that a simple and thoroughly effective form of mechanism is provided both for effecting movement of the apron and also to control the amount of manure fed, and further that effective means is employed for securing in one operation the locking and unlocking of the clutch that controls the actuating mechanism of the apron, and also the raising and lowering of the end gate.

Having thus described my invention, what I claim as new and desire to secure by Letters-Patent, is:—

1. In a manure spreader, the combination with a body member mounted on ground wheels, an endless apron carried by said body, actuating mechanism for said apron, a spreading cylinder arranged adjacent to said apron and operated by means connected with the apron actuating mechanism, an end gate movable over said cylinder to open and close the manure supply, a rock shaft mounted in brackets carried by said body and having a crank arm, a lever carried by the rock shaft and connected with said end gate, an operating lever fulcrumed to said body, and spaced rods connected with said lever above said fulcrum, one of said rods being connected at its free end with the crank arm of said rock shaft and the other rod connected with the actuating mechanism for the apron, whereby said actuating mechanism and end gate are operated simultaneously on the throw of the lever in either direction.

2. In a manure spreader, the combination with a body member mounted on ground wheels and having a guide or keeper on one side thereof, a clutch mounted on one axle, a master gear carried by the movable clutch member, a shift lever connected with said movable clutch member, a shaft mounted adjacent to and parallel with said axle and having a pinion meshing with said master gear wheel, a disk fixed on said shaft, an endless apron carried by said body, a ratchet wheel carried by the apron shaft, a hollow approximately rectangular yoke having an extension at one end slidable in the keeper on said body, an L-shaped lever fulcrumed to said body and having one arm connected at its free end with the other arm of said yoke, oppositely disposed spring-pressed pawls carried by said yoke and engaging the ratchet on the apron shaft, a slide mounted on the free arm of said L-shaped lever, a pitman eccentrically connected at one end to said shaft-carried disk and at its other end to said slide, and means under the control of the driver for shifting said slide and varying the throw of the lever connected with the yoke and the feed of the manure.

In testimony whereof I have hereunto set my hand in presence of two subscribing witnesses.

B. E. MILLER.

Witnesses:
W. E. MILLER,
A. VANSKIKE.